United States Patent
Huang

[19]

[11] Patent Number: 5,947,004
[45] Date of Patent: Sep. 7, 1999

[54] INFUSION MAKER

[76] Inventor: Yen-Wen Huang, No. 9, Lane 165, Min Fu Chiu St., Taoyuan, Taiwan

[21] Appl. No.: 09/121,659

[22] Filed: Jul. 24, 1998

[51] Int. Cl.$^6$ .............................. A47J 31/10; A47J 31/02
[52] U.S. Cl. ................................ 99/299; 99/306; 99/319; 99/322; 99/323
[58] Field of Search ............................ 99/299, 322, 319, 99/318, 323, 304, 306

[56] References Cited

U.S. PATENT DOCUMENTS

| | | | |
|---|---|---|---|
| 4,255,265 | 3/1981 | Greutert | 99/319 X |
| 5,632,194 | 5/1997 | Lin | 99/299 X |

*Primary Examiner*—Reginald L. Alexander
*Attorney, Agent, or Firm*—Bacon & Thomas

[57] ABSTRACT

An infusion maker for infusing tea, and coffee, including a container, a first inner cup suspended in the container, a second inner cup suspended in the first inner cup, and a lid covered on the second inner cup, the first inner cup having an outward top flange with top sloping ribs and a drip hole at the center of a bottom wall thereof, the second inner cup having an outward top flange with bottom sloping ribs, a wire gauze filter covered on an opened bottom side thereof, and a stopper at the center of the opened bottom side below the wire gauze filter, the sloping ribs of the second inner cup being moved with the second inner cup clockwise/counter-clockwise relative to the sloping ribs of the first inner cup between a first position where the stopper is engaged into the bottom drip hole on the first inner cup to close the passage of the bottom drip hole, and a second position where the stopper is disengaged from the bottom drip hole on the first inner cup, permitting infusion to flow out of the first inner cup to the inside of the container.

7 Claims, 4 Drawing Sheets

INFUSION MAKER

BACKGROUND OF THE INVENTION

The present invention relates to an infusion maker which comprises a container, a first inner cup suspended in the container and having a bottom drip hole, a second inner cup with a wire gauze filter suspended in the container, and a lid covered on the second inner cup, the second inner cup being rotated to close/open the bottom drip hole, enabling infusion to be separated from tea leaves.

When a container is used for infusion tea, coffee, etc., residual tea leaves or solid matter cannot be automatically separated from infusion. In order to separate residual tea leaves or solid matter from infusion, a filter device shall be used. It is inconvenient to drip infusion in this manner. If no filter means is available, one may have to drink infusion with solid matter. Further, if tea leaves are infused in boiled water too long, the natural citric acid contained in tea leaves will be damaged. However, it is inconvenient to drip infusion.

SUMMARY OF THE INVENTION

The present invention has been accomplished to provide an infusion maker which eliminates the aforesaid problems. It is the main object of the present invention to provide an infusion maker which enables infusion to be automatically separated from solid matter through a rotary control. According to the preferred embodiment of the present invention, the infusion maker comprises a container, a first inner cup suspended in the container, a second inner cup suspended in the first inner cup, and a lid covered on the second inner cup. The container has a top opening. The first inner cup comprises an outward flange raised around the periphery of an opened top side thereof and stopped outside the top opening of the container, at least one sloping rib raised from a top side of the outward flange of the first inner cup, and a drip hole at the center of a bottom wall thereof, the second inner cup inserted in the first inner cup. The second inner cup comprises an outward flange raised around the periphery of an opened top side thereof and stopped outside the opened top side of the first inner cup, at least one sloping rib raised from a bottom side of the outward flange of the second inner cup, a wire gauze filter covered on an opened bottom side thereof, and a stopper at the center of the opened bottom side below the wire gauze filter. The at least one sloping rib of the second inner cup is moved with the second inner cup clockwise/counter-clockwise relative to the at least one sloping rib of the first inner cup between a first position where the stopper is engaged into the bottom drip hole on the first inner cup to close the passage of the bottom drip hole, and a second position where the stopper is disengaged from the bottom drip hole on the first inner cup, permitting infusion to flow out of the first inner cup to the inside of the container.

DETAILED DESCRIPTION OF THE PREFERRED EMBODIMENT

Figure 1:
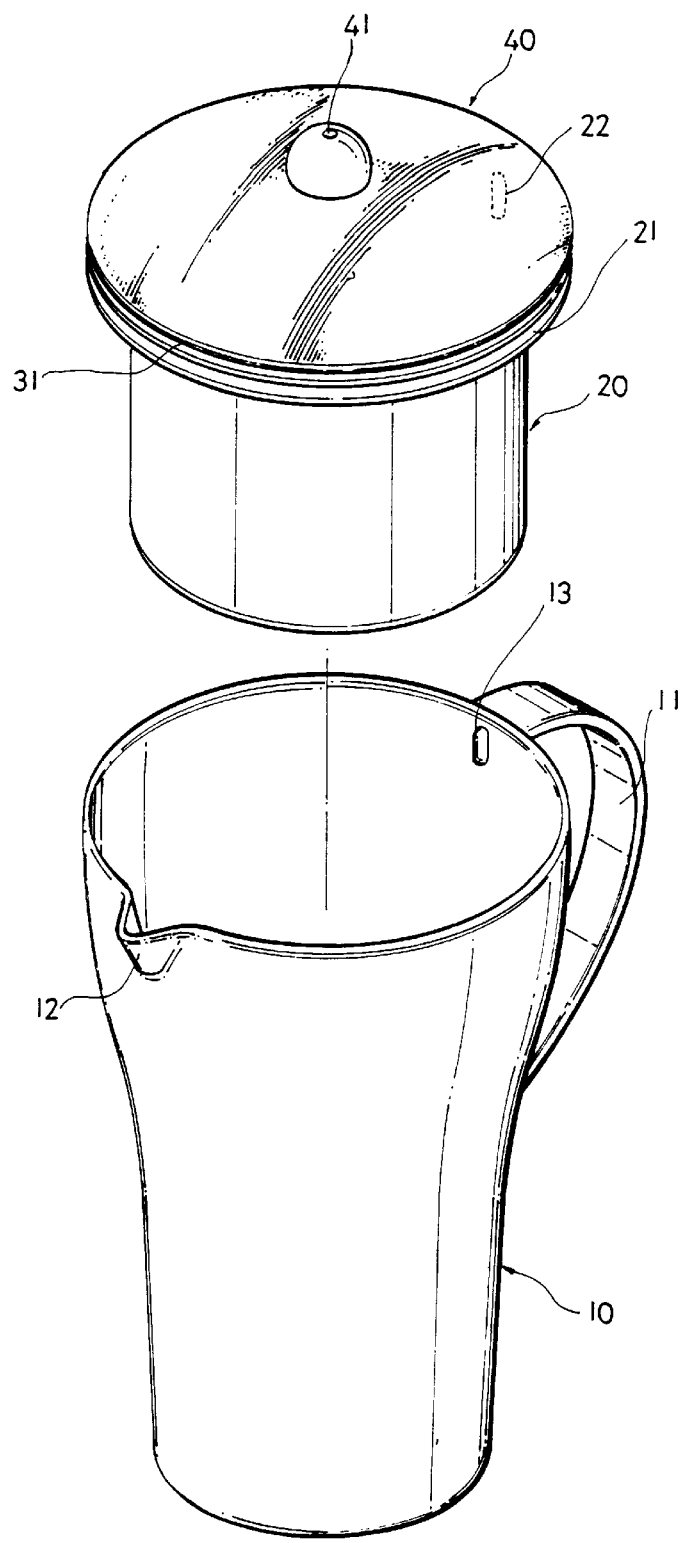
FIG. 1 is an exploded view of an infusion maker according to the present invention.
Figure 2:
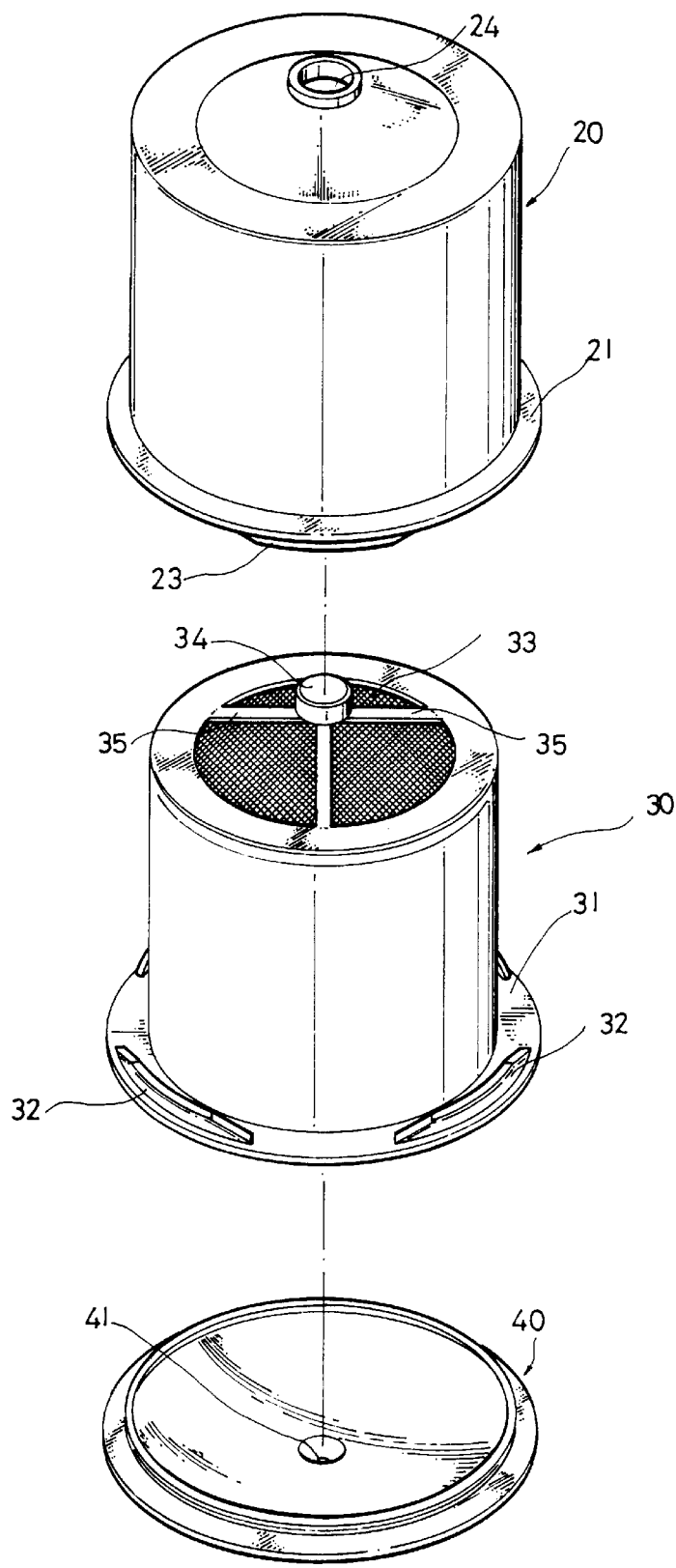
FIG. 2 is an exploded view of the first inner cup, the second inner cup and the lid according to the present invention.

Referring to FIGS. 1 and 2, an infusion maker for infusion tea in accordance with the present invention is generally comprised of a container 10, a first inner cup 20, a second inner cup 30, and a lid 40. The lid 40 has an air vent 41, and is provided for covering the second inner cup 30. The second inner cup 30 comprises an outward top flange 31 raised around the periphery of the opened top side thereof, a plurality of sloping ribs 32 raised from the outward top flange 31 at the bottom, a plurality of arm rods 35 radially connected together at the opened bottom side, a wire gauze filter 33 covered on the opened bottom side and supported on the arm rods 35, and a stopper 34 raised from the center of the arm rods 35. The second inner cup 30 can be inserted into the first inner cup 20, permitting the outward top flange 31 to be stopped outside the first inner cup 20. The first inner cup 20 comprises an outward top flange 21 raised around the periphery of the opened top side thereof, a plurality of sloping ribs 23 raised from the outward top flange 21 at the top, and a bottom drip hole 24 at the center of the closed bottom side thereof. When the second inner cup 30 is inserted into the first inner cup, the sloping ribs 32 of the second inner cup 30 are respectively attached to the sloping ribs 23 of the first inner cup 20, and the stopper 34 is engaged into the drip hole 24 to close its passage. The container 10 has a spout 12 at the periphery of the opened top side thereof, a handle 11 integral with the outside wall thereof, and at least one stop rod 13 raised from the inside wall thereof near the top. The first inner cup 20 has at least one stop rod 22 raised from the outside wall thereof. When the first inner cup 20 is inserted into the container 10 and rotated, the stop rod 22 will be stopped at the stop rod 13 to limit the angle of rotation of the first inner cup 20 in the container 10 i.e., the first inner cup 20 can be stopped at the stop rod 13 in the container 10.

Figure 3:
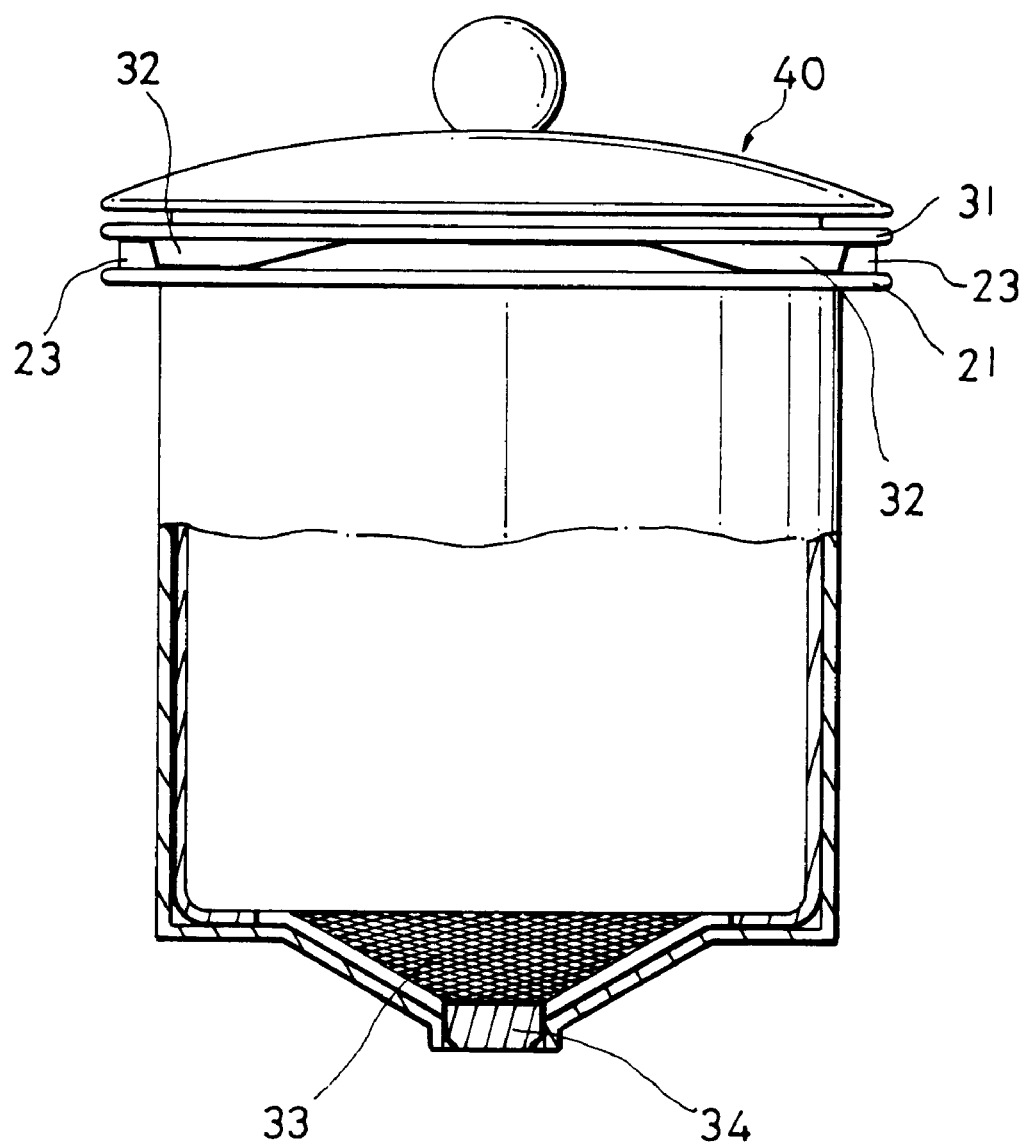
FIG. 3 is a sectional view of the infusion maker shown in FIG. 1.

Referring to FIG. 3, when the second inner cup 30 is inserted in the first inner cup 20, the stopper 34 is engaged into the bottom drip hole 24 to close the bottom side of the first inner up 20. Thus, boiling water can be poured in the second inner cup 30 to infuse tea leaves or the like.

Figure 4:
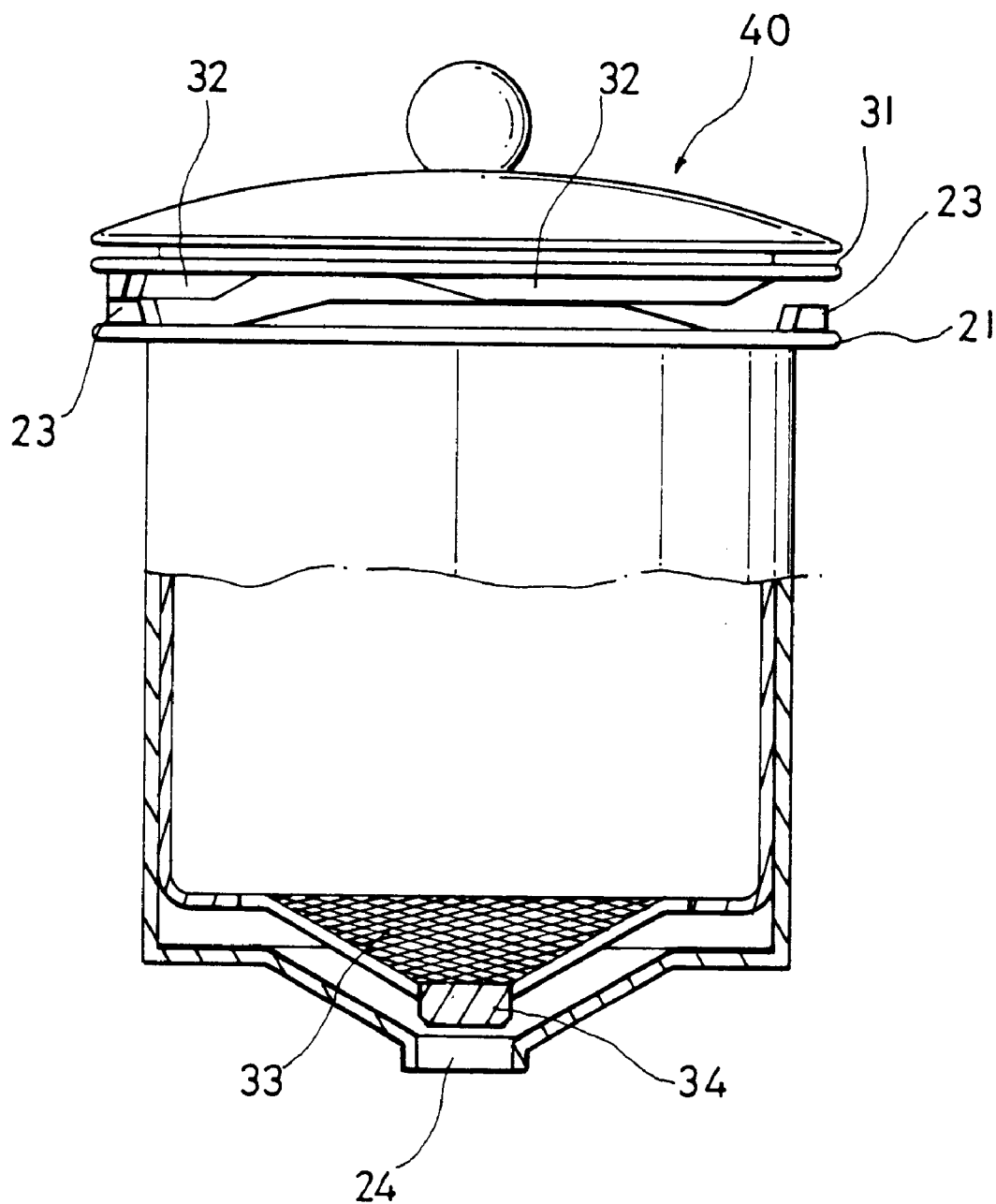
FIG. 4 is similar to FIG. 3 but showing the first inner cup lifted from the container.

Referring to FIG. 4, a certain length of time after infusion, the second inner cup 30 is rotated by hand in the first inner cup 20, causing the sloping ribs 32 to be moved with the second inner cup 30 over the sloping ribs 23 at the outward flange 21 of the first inner cup 20 (because the first inner cup 20 is stopped at the stop rod 13 inside the container 10, the first inner cup 20 stands still when the second inner cup 30 is rotated. When the sloping ribs 32 are moved with the second inner cup 30 over the sloping ribs 23 at the outward flange 21 of the first inner cup 20, the second inner cup 30 is lifted from the first inner cup 20 to disengage the stopper 34 from the bottom drip hole 24, enabling infusion to flow out of the bottom drip hole 24 of the first inner cup 20 to the inside of the container 10. Through the handle 11, the container 10 can be lifted with the hand and tilted to let infusion flow out of the container 10 through the spout 12 to for example a drinking cup.

While only one embodiment of the present invention has been shown and described, it will be understood that various modifications and changes could be made thereunto without departing from the spirit and scope of the invention disclosed. For example, foot members may be provided at the bottom side of the first inner cup 20. When the first inner cup 20 is placed on a flat surface, the bottom drip hole 24 is spaced from the flat surface at a distance by the foot members to prevent a contamination.

What the invention claimed is:

1. An infusion maker comprising:

a container having a top opening;

a first inner cup inserted in said container, said first inner cup having an outward flange raised around the periphery of an opened top side thereof and stopped outside the top opening of said container, at least one sloping rib raised from a top side of the outward flange of said first inner cup, and a drip hole at the center of a bottom wall thereof;

a second inner cup inserted in said first inner cup, said second inner cup comprising an outward flange raised around the periphery of an opened top side thereof and stopped outside the opened top side of said first inner cup, at least one sloping rib raised from a bottom side of the outward flange of said second inner cup, a wire gauze filter covered on an opened bottom side thereof, and a stopper at the center of the opened bottom side below said wire gauze filter, the at least one sloping rib of said second inner cup being moved with said second inner cup clockwise/counter-clockwise relative to the at least one sloping rib of said first inner cup between a first position where said stopper is engaged into the bottom drip hole on said first inner cup to close the passage of said bottom drip hole, and a second position where said stopper is disengaged from the bottom drip hole on said first inner cup, permitting infusion to flow out of said first inner cup to the inside of said container.

2. The infusion maker of claim 1 wherein said first inner cup has a plurality of foot members raised from the bottom wall thereof on the outside for supporting said inner cup on a flat surface.

3. The infusion maker of claim I wherein said first inner cup has at least one stop rod raised from the periphery, said container has at least one stop rod raised from an inside wall thereof for stopping against the at least one stop rod of said first inner cup.

4. The infusion maker of claim 1 wherein said container comprises a handle.

5. The infusion maker of claim 1 wherein said container comprises a spout.

6. The infusion maker of claim 1 further comprising a lid for covering on the opened top side of said second inner cup, said lid having at least one air vent.

7. The infusion maker of claim 1 wherein said second inner cup comprises a plurality of arm robs radially connected together at the opened bottom side blow said wire gauze filter and fixedly connected to said stopper.

* * * * *